United States Patent
Archer, III et al.

(10) Patent No.: US 12,100,092 B2
(45) Date of Patent: Sep. 24, 2024

(54) INTEGRATING AUGMENTED REALITY INTO THE WEB VIEW PLATFORM

(71) Applicant: Snap Inc., Santa Monica, CA (US)

(72) Inventors: Virgil L. Archer, III, Los Angeles, CA (US); Kyle Dumo, Canoga Park, CA (US); Allen Huang, Redondo Beach, CA (US); Ngoan Nguyen, Huntington Beach, CA (US); Bernardo Perez, Los Angeles, CA (US); Aung Win Thein, Carson, CA (US)

(73) Assignee: Snap Inc., Santa Monica, CA (US)

( * ) Notice: Subject to any disclaimer, the term of this patent is extended or adjusted under 35 U.S.C. 154(b) by 26 days.

(21) Appl. No.: 17/359,843

(22) Filed: Jun. 28, 2021

(65) Prior Publication Data

US 2022/0414969 A1    Dec. 29, 2022

(51) Int. Cl.
*G06T 15/00*    (2011.01)
*G06F 3/0488*   (2022.01)
*G06T 13/20*    (2011.01)
*G06T 19/00*    (2011.01)
*H04L 51/046*   (2022.01)
*H04L 51/10*    (2022.01)

(52) U.S. Cl.
CPC .......... *G06T 15/005* (2013.01); *G06F 3/0488* (2013.01); *G06T 13/20* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 5,689,669 A | 11/1997 | Lynch et al. |
| 6,002,853 A | 12/1999 | De |
| 6,079,982 A |  6/2000 | Meader |
| 6,119,147 A |  9/2000 | Toomey et al. |

(Continued)

FOREIGN PATENT DOCUMENTS

| | | |
|---|---|---|
| CN | 115699703 A | 2/2023 |
| CN | 116034393 A | 4/2023 |

(Continued)

OTHER PUBLICATIONS

"International Application Serial No. PCT/US2022/073210, International Search Report dated Oct. 11, 2022", 4 pgs.

(Continued)

*Primary Examiner* — Michael J Cobb
(74) *Attorney, Agent, or Firm* — Schwegman Lundberg & Woessner, P.A.

(57) ABSTRACT

A methodology is described that provides access to an augmented reality (AR) component maintained by a messaging server system directly from a web view application. When a user activates, from a web view application executing in the messaging client, a user selectable element that references an AR component, a web view AR system obtains the identification of the AR component, performs validation of the identification and of any additional launch data, and launches a camera view user interface (UI) with the AR component loaded in the camera view UI. Content captured from the camera view UI can be shared to other computing devices.

20 Claims, 11 Drawing Sheets

(56) References Cited

U.S. PATENT DOCUMENTS

| | | | |
|---|---|---|---|
| 6,179,619 B1 | 1/2001 | Tanaka | |
| 6,219,045 B1 | 4/2001 | Leahy et al. | |
| 6,243,091 B1 | 6/2001 | Berstis | |
| 6,271,843 B1 | 8/2001 | Lection et al. | |
| 6,362,817 B1 | 3/2002 | Powers et al. | |
| 6,396,522 B1 | 5/2002 | Vu | |
| 6,414,679 B1 | 7/2002 | Miodonski et al. | |
| 6,570,563 B1 | 5/2003 | Honda | |
| 6,573,903 B2 | 6/2003 | Gantt | |
| 6,590,593 B1 | 7/2003 | Robertson et al. | |
| 6,621,508 B1 | 9/2003 | Shiraishi et al. | |
| 6,690,393 B2 | 2/2004 | Heron et al. | |
| 6,784,901 B1 | 8/2004 | Harvey et al. | |
| 6,961,055 B2 | 11/2005 | Doak et al. | |
| 7,119,819 B1 | 10/2006 | Robertson et al. | |
| 7,382,288 B1 | 6/2008 | Wilson et al. | |
| 7,414,629 B2 | 8/2008 | Santodomingo et al. | |
| 7,467,356 B2 | 12/2008 | Gettman et al. | |
| 7,542,040 B2 | 6/2009 | Templeman | |
| 7,653,877 B2 | 1/2010 | Matsuda | |
| 7,663,625 B2 | 2/2010 | Chartier et al. | |
| 7,746,343 B1 | 6/2010 | Charaniya et al. | |
| 7,788,323 B2 | 8/2010 | Greenstein et al. | |
| 7,804,507 B2 | 9/2010 | Yang et al. | |
| 7,814,429 B2 | 10/2010 | Buffet et al. | |
| 7,817,150 B2 | 10/2010 | Reichard et al. | |
| 7,844,724 B2 | 11/2010 | Van et al. | |
| 8,797,353 B2 | 8/2014 | Bregman-amitai et al. | |
| 9,244,533 B2 | 1/2016 | Friend et al. | |
| 9,696,795 B2 | 7/2017 | Marcolina et al. | |
| 9,996,797 B1 | 6/2018 | Holz et al. | |
| 10,516,853 B1 | 12/2019 | Gibson et al. | |
| 10,565,795 B2* | 2/2020 | Charlton | H04W 4/021 |
| 10,572,215 B1 | 2/2020 | Cooper et al. | |
| 11,238,660 B2 | 2/2022 | Charlton et al. | |
| 11,521,334 B2* | 12/2022 | Luo | G06T 11/60 |
| 11,704,880 B2 | 7/2023 | Charlton et al. | |
| 11,743,340 B2 | 8/2023 | Charlton et al. | |
| 2001/0018667 A1 | 8/2001 | Kim | |
| 2002/0095463 A1 | 7/2002 | Matsuda | |
| 2002/0113820 A1 | 8/2002 | Robinson et al. | |
| 2004/0113887 A1 | 6/2004 | Pair et al. | |
| 2004/0193441 A1 | 9/2004 | Altieri | |
| 2005/0093719 A1 | 5/2005 | Okamoto et al. | |
| 2005/0128212 A1 | 6/2005 | Edecker et al. | |
| 2008/0030429 A1 | 2/2008 | Hailpern et al. | |
| 2008/0125218 A1 | 5/2008 | Collins | |
| 2008/0235570 A1 | 9/2008 | Sawada et al. | |
| 2008/0246693 A1 | 10/2008 | Hailpern et al. | |
| 2009/0076791 A1 | 3/2009 | Rhoades et al. | |
| 2009/0091583 A1 | 4/2009 | Mccoy | |
| 2009/0287728 A1 | 11/2009 | Martine et al. | |
| 2009/0300528 A1 | 12/2009 | Stambaugh | |
| 2010/0070378 A1 | 3/2010 | Trotman et al. | |
| 2010/0115428 A1 | 5/2010 | Shuping et al. | |
| 2010/0205541 A1 | 8/2010 | Rapaport et al. | |
| 2010/0214284 A1 | 8/2010 | Rieffel et al. | |
| 2010/0274567 A1 | 10/2010 | Carlson et al. | |
| 2010/0274627 A1 | 10/2010 | Carlson | |
| 2011/0010636 A1 | 1/2011 | Hamilton et al. | |
| 2011/0041083 A1 | 2/2011 | Gabai et al. | |
| 2012/0249741 A1 | 10/2012 | Maciocci et al. | |
| 2013/0304729 A1 | 11/2013 | Jiang et al. | |
| 2014/0076965 A1 | 3/2014 | Becorest et al. | |
| 2014/0082526 A1 | 3/2014 | Park et al. | |
| 2014/0282105 A1 | 9/2014 | Nordstrom | |
| 2015/0206349 A1* | 7/2015 | Rosenthal | G06T 19/006 345/633 |
| 2017/0185261 A1 | 6/2017 | Perez et al. | |
| 2017/0243403 A1 | 8/2017 | Daniels et al. | |
| 2017/0289338 A1 | 10/2017 | Riva et al. | |
| 2018/0131907 A1 | 5/2018 | Schmirler et al. | |
| 2018/0204059 A1 | 7/2018 | Antol et al. | |
| 2018/0225267 A1 | 8/2018 | Warner, Jr. | |
| 2018/0357472 A1 | 12/2018 | Dreessen | |
| 2019/0087015 A1 | 3/2019 | Lam et al. | |
| 2019/0104093 A1 | 4/2019 | Lim et al. | |
| 2019/0107990 A1* | 4/2019 | Spivack | G06T 11/60 |
| 2019/0107991 A1* | 4/2019 | Spivack | G09G 5/14 |
| 2019/0108578 A1* | 4/2019 | Spivack | G09B 5/065 |
| 2019/0179405 A1 | 6/2019 | Sun et al. | |
| 2019/0310757 A1 | 10/2019 | Lee et al. | |
| 2019/0313059 A1* | 10/2019 | Agarawala | G06T 19/006 |
| 2019/0318540 A1 | 10/2019 | Piemonte et al. | |
| 2019/0329134 A1 | 10/2019 | Shriram et al. | |
| 2019/0391825 A1 | 12/2019 | Jann et al. | |
| 2020/0092537 A1 | 3/2020 | Sutter et al. | |
| 2020/0110928 A1 | 4/2020 | Al Jazaery et al. | |
| 2020/0117267 A1 | 4/2020 | Gibson et al. | |
| 2020/0117270 A1 | 4/2020 | Gibson et al. | |
| 2020/0245017 A1 | 7/2020 | Ganschow et al. | |
| 2020/0309944 A1 | 10/2020 | Thoresen et al. | |
| 2020/0320791 A1 | 10/2020 | Yeh | |
| 2020/0356610 A1 | 11/2020 | Coimbra et al. | |
| 2020/0368616 A1 | 11/2020 | Delamont | |
| 2021/0008413 A1 | 1/2021 | Asikainen et al. | |
| 2021/0041951 A1 | 2/2021 | Gibson et al. | |
| 2021/0065448 A1 | 3/2021 | Goodrich et al. | |
| 2021/0390781 A1 | 12/2021 | Charlton et al. | |
| 2021/0392204 A1 | 12/2021 | Charlton et al. | |
| 2022/0130119 A1 | 4/2022 | Charlton et al. | |
| 2022/0179665 A1* | 6/2022 | Rathod | G06F 9/451 |
| 2023/0306696 A1 | 9/2023 | Charlton et al. | |
| 2023/0319145 A1 | 10/2023 | Charlton et al. | |

FOREIGN PATENT DOCUMENTS

| | | |
|---|---|---|
| CN | 117581519 A | 2/2024 |
| KR | 20110134736 | 12/2011 |
| KR | 20200053914 A | 5/2020 |
| WO | 2019055703 | 3/2019 |
| WO | WO-2021194855 A1 | 9/2021 |
| WO | WO-2021252237 A1 | 12/2021 |
| WO | WO-2021252256 A1 | 12/2021 |
| WO | WO-2023278988 A1 | 1/2023 |

OTHER PUBLICATIONS

"International Application Serial No. PCT/US2022/073210, Written Opinion dated Oct. 11, 2022", 5 pgs.

"International Application Serial No. PCT/US2021/035389, International Search Report dated Sep. 27, 2021", 3 pgs.

"International Application Serial No. PCT/US2021/035389, Written Opinion dated Sep. 27, 2021", 4 pgs.

"International Application Serial No. PCT/US2022/073210, International Preliminary Report on Patentability dated Jun. 12, 2023", 6 pgs.

"International Application Serial No. PCT/US2021/035389, Response to Written Opinion and Article 34 Amendments filed Apr. 27, 2023", 20 pgs.

"U.S. Appl. No. 16/948,268, Corrected Notice of Allowability mailed Sep. 27, 2021", 7 pgs.

"U.S. Appl. No. 16/948,268, Notice of Allowance mailed Sep. 22, 2021", 11 pgs.

"U.S. Appl. No. 17/248,164, Advisory Action mailed Feb. 27, 2023", 3 pgs.

"U.S. Appl. No. 17/248,164, Examiner Interview Summary mailed Jul. 27, 2022", 2 pgs.

"U.S. Appl. No. 17/248,164, Examiner Interview Summary mailed Dec. 16, 2022", 2 pgs.

"U.S. Appl. No. 17/248,164, Final Office Action mailed Nov. 23, 2022", 16 pgs.

"U.S. Appl. No. 17/248,164, Non Final Office Action mailed Mar. 29, 2022", 14 pgs.

"U.S. Appl. No. 17/248,164, Notice of Allowance mailed Apr. 3, 2023", 11 pgs.

"U.S. Appl. No. 17/248,164, Response filed Jan. 23, 2023 to Final Office Action mailed Nov. 23, 2022", 14 pgs.

"U.S. Appl. No. 17/248,164, Response filed Jul. 28, 2022 to Non Final Office Action mailed Mar. 29, 2022", 10 pgs.

(56) References Cited

OTHER PUBLICATIONS

"U.S. Appl. No. 17/570,037, Non Final Office Action mailed Dec. 6, 2022", 13 pgs.
"U.S. Appl. No. 17/570,037, Notice of Allowance mailed Mar. 1, 2023", 10 pgs.
"U.S. Appl. No. 17/570,037, Response filed Feb. 20, 2023 to Non Final Office Action mailed Dec. 6, 2022", 8 pgs.
"U.S. Appl. No. 18/202,575, Non Final Office Action mailed Dec. 14, 2023", 14 pgs.
"U.S. Appl. No. 18/202,575, Notice of Allowance mailed Mar. 13, 2024", 10 pgs.
"U.S. Appl. No. 18/202,575, Response filed Feb. 22, 2024 to Non Final Office Action mailed Dec. 14, 2023", 6 pgs.
"U.S. Appl. No. 18/207,024, Non Final Office Action mailed Feb. 1, 2024", 17 pgs.
"European Application Serial No. 21821378.3, Extended European Search Report mailed Feb. 20, 2024", 7 pgs.
"International Application Serial No. PCT/US2021/035389, International Preliminary Report on Patentability mailed Dec. 22, 2022", 6 pgs.
"International Application Serial No. PCT/US2021/035630, International Preliminary Report on Patentability mailed Dec. 22, 2022", 6 pgs.
"International Application Serial No. PCT/US2021/035630, International Search Report mailed Sep. 7, 2021", 3 pgs.
"International Application Serial No. PCT/US2021/035630, Written Opinion mailed Sep. 7, 2021", 4 pgs.
"Korean Application Serial No. 10-2023-7000563, Notice of Preliminary Rejection mailed Jan. 5, 2024", w/ English Translation, 11 pgs.
U.S. Appl. No. 17/248,164, U.S. Pat. No. 11,743,340, filed Jan. 12, 2021, Deep Linking to Augmented Reality Components.
U.S. Appl. No. 18/207,024, filed Jun. 7, 2023, Deep Linking to Augmented Reality Components.
U.S. Appl. No. 16/948,268, U.S. Pat. No. 11,238,660, filed Sep. 10, 2020, Dynamic Augmented Reality Components.
U.S. Appl. No. 17/570,037, U.S. Pat. No. 11,704,880, filed Jan. 6, 2022, Dynamic Augmented Reality Components.
U.S. Appl. No. 18/202,575, filed May 26, 2023, Dynamic Augmented Reality Components.
"U.S. Appl. No. 18/207,024, Response filed Apr. 30, 2024 to Non Final Office Action mailed Feb. 1, 2024", 10 pgs.
"U.S. Appl. No. 18/202,575, Notice of Allowance mailed Jul. 22, 2024", 10 pgs.
"U.S. Appl. No. 18/207,024, Corrected Notice of Allowability mailed Jul. 12, 2024", 4 pgs.
"U.S. Appl. No. 18/207,024, Notice of Allowance mailed Jun. 7, 2024", 14 pgs.
"European Application Serial No. 21821926.9, Extended European Search Report mailed May 21, 2024", 8 pgs.

\* cited by examiner

INTEGRATING AUGMENTED REALITY INTO THE WEB VIEW PLATFORM

TECHNICAL FIELD

The present disclosure relates generally to facilitating interactions between a messaging client and third-party resources.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, can be designed to run on a mobile device such as a phone, a tablet, or a wearable device, while having a backend service provided on a server computer system to perform operations that may require resources greater than is reasonable to perform at a client device (e.g., storing large amounts of data or performing computationally expensive processing). For example, a messaging client and the associated messaging system that hosts a backend for the messaging client may be configured to permit online users to share content. A messaging client may include an embedded web browser, which is termed a web view. A web view is configured to display web content, such as web pages and web applications, from within the messaging client.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
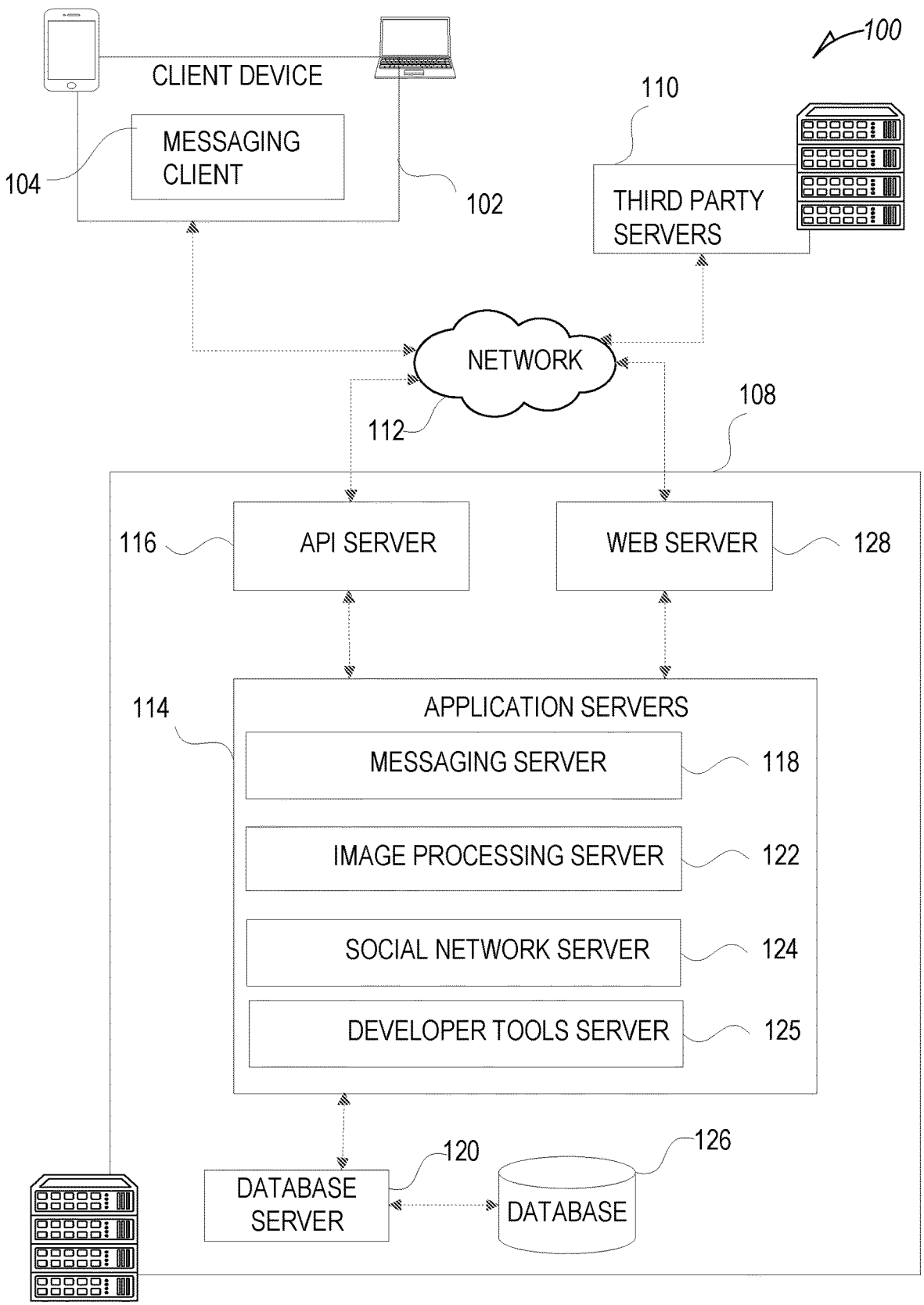
FIG. 1 is a diagrammatic representation of a networked environment in which a developer tools system may be deployed, in accordance with some examples.

Examples of the present disclosure seek to improve the functionality of electronic messaging software and systems by enhancing users' experience of engaging with augmented reality (AR) technology. AR technology enhances/augments a user's view of a physical environment, which can be experienced by viewing of the output of the digital image sensor of a camera for example, by adding computer-generated perceptual information. A computer implemented component that provides a particular AR functionality, for example a modification in the form of an overlaid image or animation, is referred to as an AR component, for the purposes of this description. The users' experience of engaging with AR technology is enhanced by permitting users to access functionality of an AR component directly from an application executing in a web view of the messaging client. An application executing in a web view of the messaging client is referred to as a web view application, for the purposes of this description.

The technical problem of facilitating access to an AR component directly from a web view application is addressed by providing a web view AR system configured to load an AR component directly from a web view application. The web view AR system encompass various components that are being engaged in the process of permitting a user to access an AR component directly from a web view application, as well as components that are used in generating content captured using an AR component assessed directly from a web view application, generating a message that includes content captured using an AR component assessed directly from a web view application, as well as components that perform validation of data used in the process of loading the AR component. When an AR component is loaded, the output of a digital image sensor of a camera is augmented with the modification provided by the AR component. For example, an AR component can be configured to detect the head position of the person being captured by the digital image sensor and overlay an image of a party hat over the detected head position, such that the viewer would see the person presented on the camera view screen as wearing the party hat.

In some examples, the web view AR system is engaged when a user activates, from a web view application executing in the messaging client, a user selectable element associated with a deep link that references an AR component. The web view AR system decrypts payload of the deep link to obtain identification of the AR component, performs validation of the identification and of any additional launch data, and launches a camera view user interface (UI) with the AR component loaded in the camera view UI. The camera view UI is displayed by the messaging client and includes graphics referencing the AR component, the output of a digital image sensor of a camera and a user selectable element actionable to capture the output of a digital image sensor of a camera, which is modified by an AR component when the AR component is loaded, or to start and stop video recording.

Some functionality of the web view AR system is provided as part of a Software Development Kit (SDK) that includes Application Programming Interfaces (APIs) that can be called or invoked by the web-based apps. In some examples, the SDK includes an interface that provides support for deep linking into an AR component from a web view application, as well as a method that provides support for passing attributes from a web view application to an AR component. A deep link to an AR component includes an identification of an AR component, optionally arbitrary values, termed launch attributes, to be passed into the AR component at launch from a web view application, and optionally an argument permitting a deep link to the web view application.

Some functionality of the web view AR system is provided as part of the messaging client, specifically, as a bridge method included in a web view interface component responsible for launching and hosting a web view in the messaging client. The web view interface bridges the SDK included in a web view application and a validation service residing at the backend of the messaging client, and also provides launch parameters of an AR component to the camera view UI. For example, the web view interface receives from the SDK a request that includes a deep link to an AR component and passes it to the web view interface, which passes it to the validating service. If validation of parameters included in the deep link is successful, the web view interface converts the identification of the AR component if necessary (for example, from universally unique identifier (UUID) into an identifier internal to the messaging system), unlocks the AR component to make the AR component available for loading in the camera view UI, and loads the AR component in the camera view UI. The validation service residing at the backend of the messaging client is also considered as part of the web view AR system. The camera view UI launched by the web view AR system, in some examples, permits access to a single AR component in order to reduce users' distraction. Thus, in some examples, the AR component is the only AR component in the camera view user interface. A user can capture the output of the digital image sensor modified by the AR component and activate a share flow from camera view UI, which may result in communication of the captured content from the messaging client executing at the sender computing device to the messaging client executing at another computing device or in posting the captured content to be available for viewing to at least a subset of users of the messaging system. The web view interface dismisses the camera view UI after at the end of share flow and resumes execution of the web view application at the point at which the web view AR system was engaged from the web application. In some examples, the web application is provided by a distinct entity from the messaging client.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications using Applications Program interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
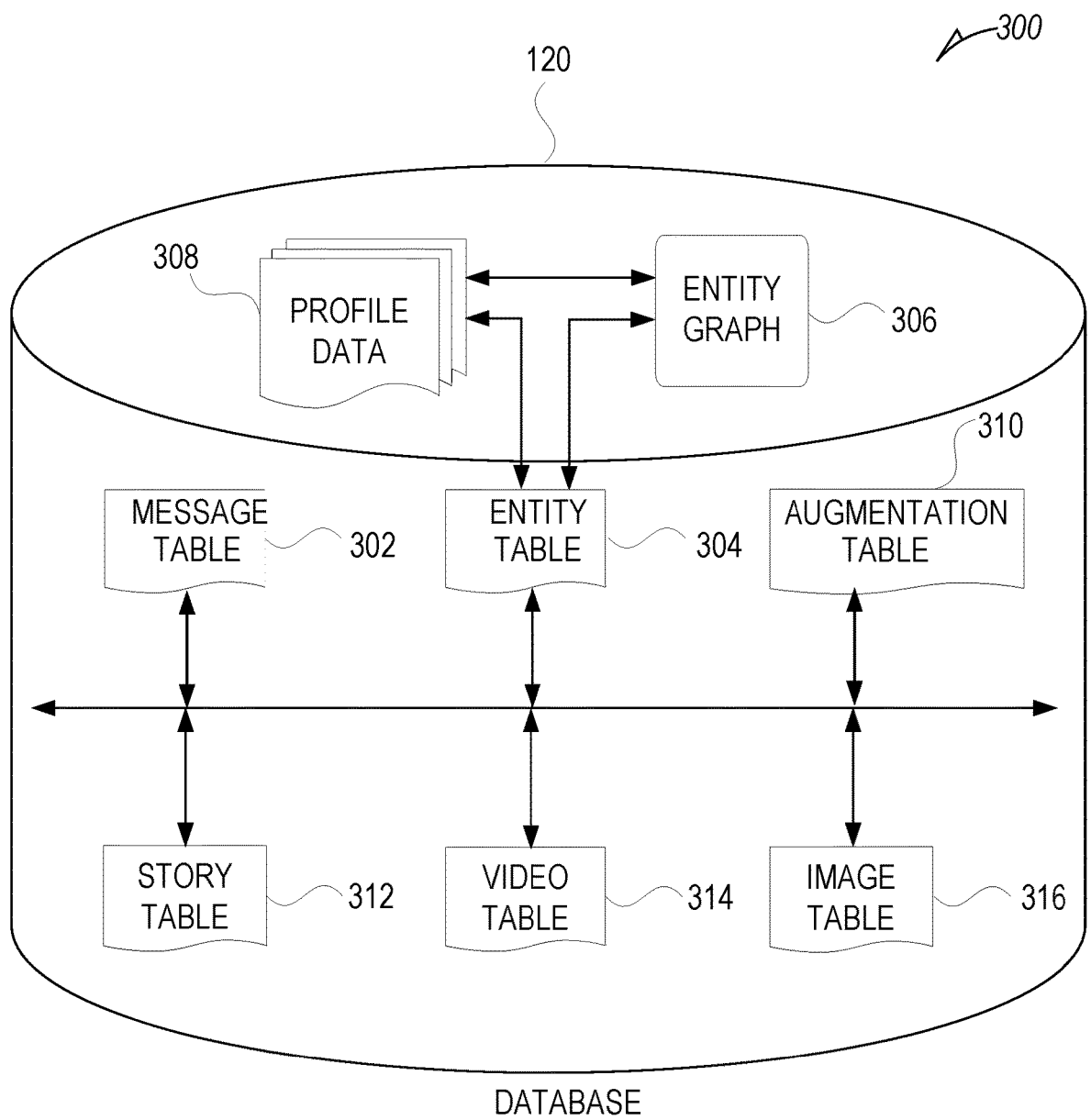
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application installed on the client device 102 or a web view application executing in the web view in the messaging client 104) are made available to a user via an interface of the messaging client 104. The external resource is often provided by a third party but may also be provided by the creator or provider of the messaging client 104. The messaging client 104 receives a user selection of an option to launch or access features of such an external resource.

In response to receiving a user selection of the option to launch or access features of the external resource, the messaging client 104 determines whether the selected external resource is a web-based external resource or a locally-installed application. In some cases, applications that are locally installed on the client device 102 can be launched independently of and separately from the messaging client 104, such as by selecting an icon, corresponding to the application, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally installed application, the messaging client 104 instructs the client device 102 to launch the external resource by executing locally stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources to a user to launch or access a given external resource. This list can be presented in a context-sensitive menu. For example, the icons representing different ones of the web view apps can vary based on how the menu is launched by the user (e.g., from a conversation interface or from a non-conversation interface).

Also shown in FIG. 1 is a developer tools server 125. The developer tools server 125 maintains one or more software developer kits (SDKs) that permit users to integrate some of the features provided with the messaging server system across their application, which may be a web view application. These features include permitting access to an AR component directly from a web view application. The functionality provided by the developer tools server 125 can be accessed from third party computer systems via a developer portal, which may be accessed via a web browser. A developer portal, in some examples, can be downloaded to a third-party computer system, in which case it may not require the use of a web browser.

System Architecture

Figure 2:
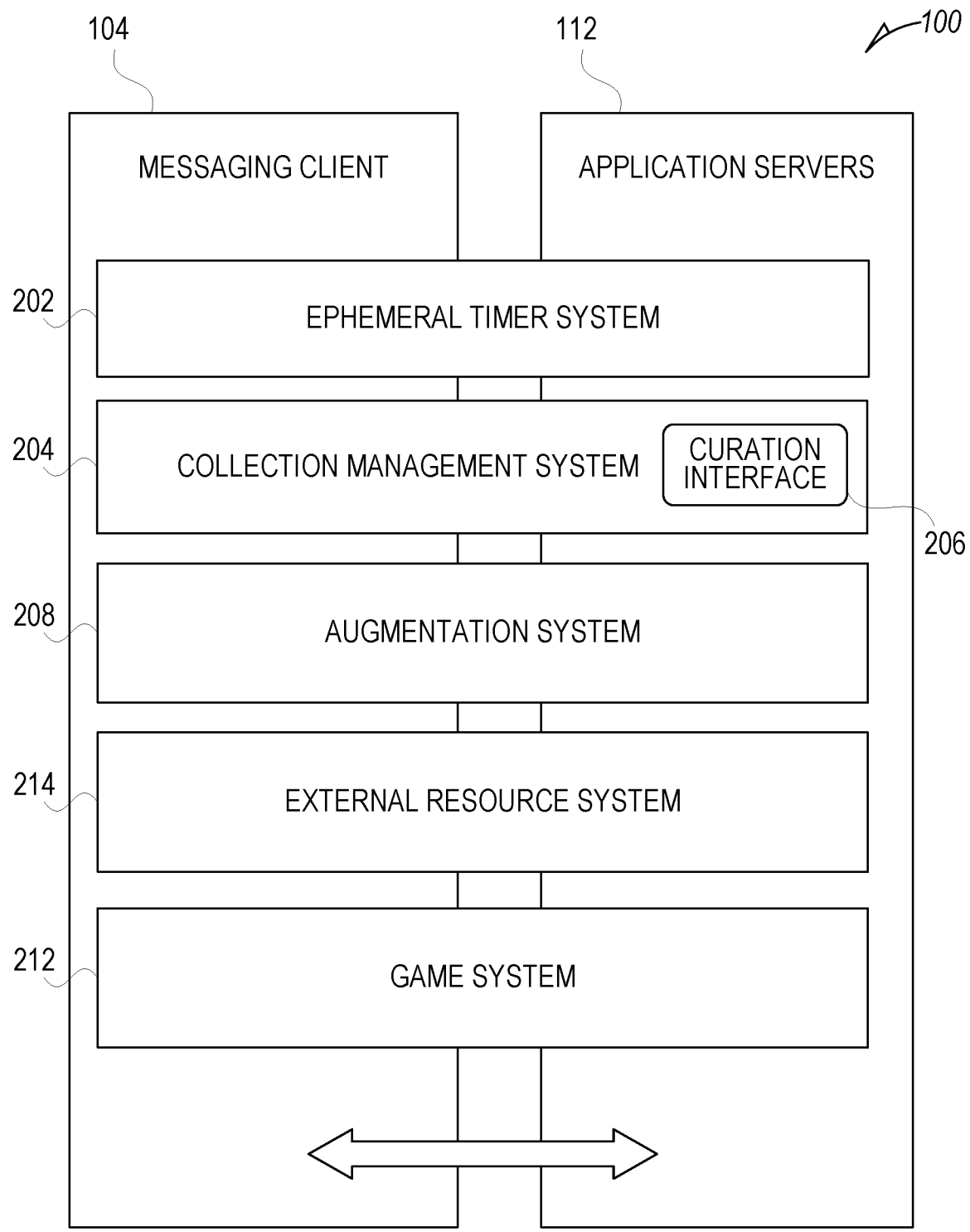
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100, which embodies a number of subsystems that are supported on the client-side by the messaging client 104 and on the sever-side by the application servers 114, can be said to host a backend service for the messaging client 104. These subsystems include, for example, an ephemeral timer system 202, a collection management system 204, an augmentation system 208, a map system 210, a game system 212, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include content, which was generated using an AR component that was loaded directly from a web view application. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets such as the web view application. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. As stated above, a web-based resource executing in a web view of the messaging client is referred to as a web view application for the purposes of this description. In certain examples, the messaging server 118 includes a JavaScript library, that provides a given external resource, a web view application for example, access to certain user data of the messaging client 104. HTML5 is used as an example technology for programming web view apps and games, but applications and resources programmed based on other technologies can be used. In some examples, the SDK includes an interface that provides support for deep linking into an AR component from a web view application, as well as a method that provides support for passing attributes from a web view application to an AR component.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., a web view app) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated using an AR component that was loaded directly from a web view application. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user's name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using the AR component.

A collection may also constitute a "live story," which is a collection of content from multiple users that is created manually, automatically, or using a combination of manual and automatic techniques. For example, a "live story" may constitute a created stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
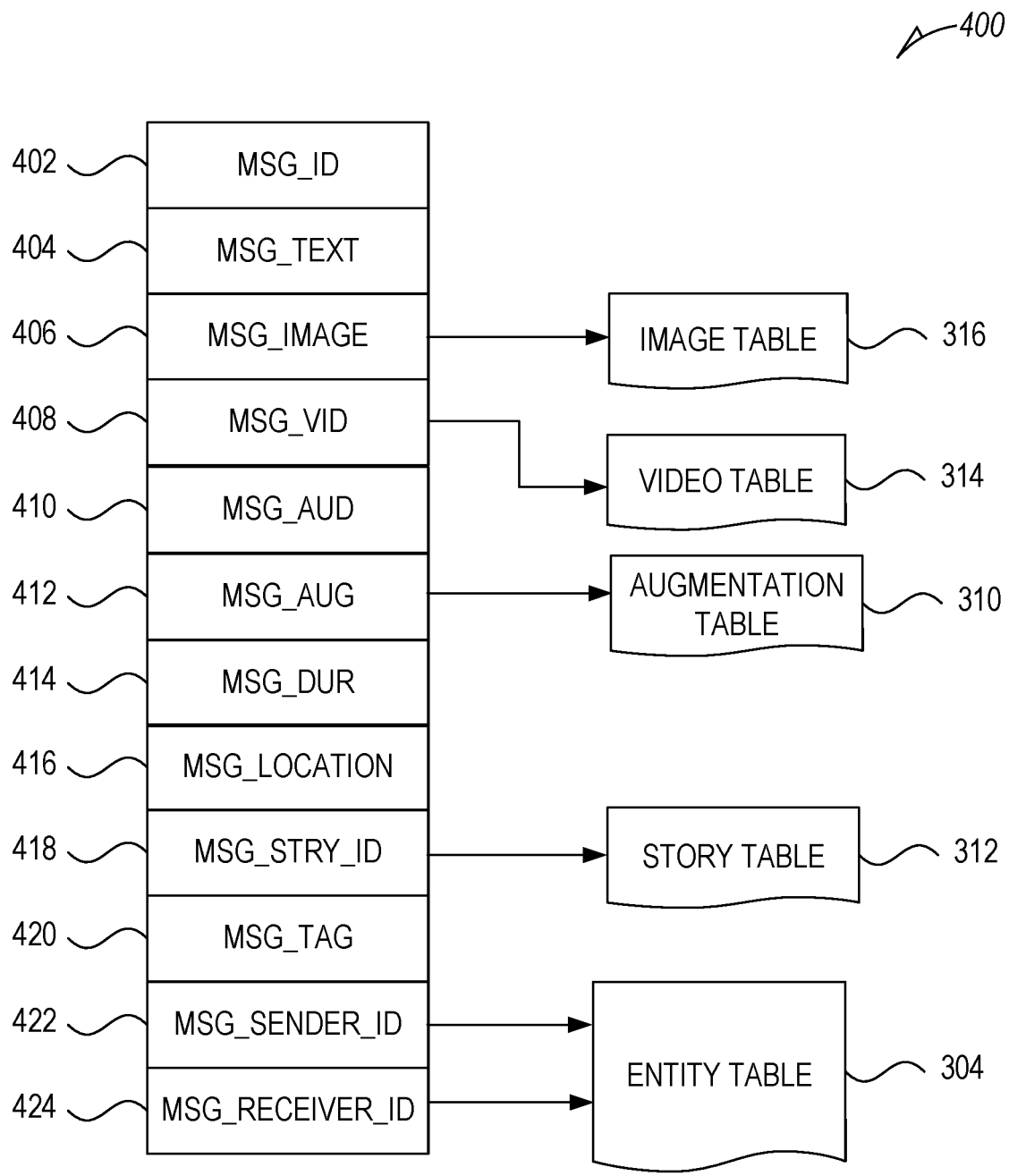
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 114. The content of a message 400, in some examples, includes an image or a video that was created using the AR component. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, message audio payload 410 of the message 400, as well as a reference to a web view application, from which an AR component was invoked. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
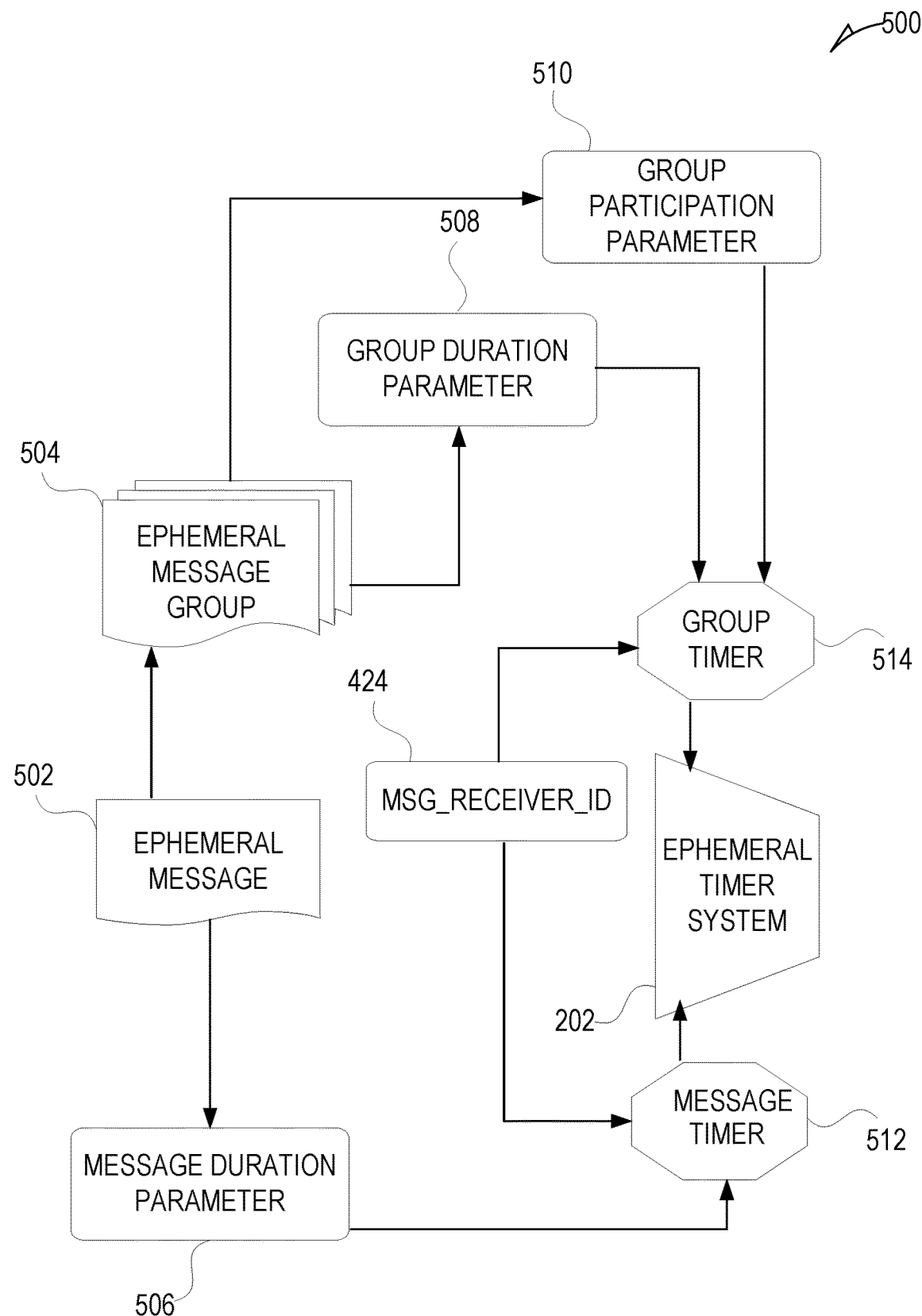
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created using an AR component that was loaded directly from a web view application.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Process Flow and User Interfaces

Figure 6:
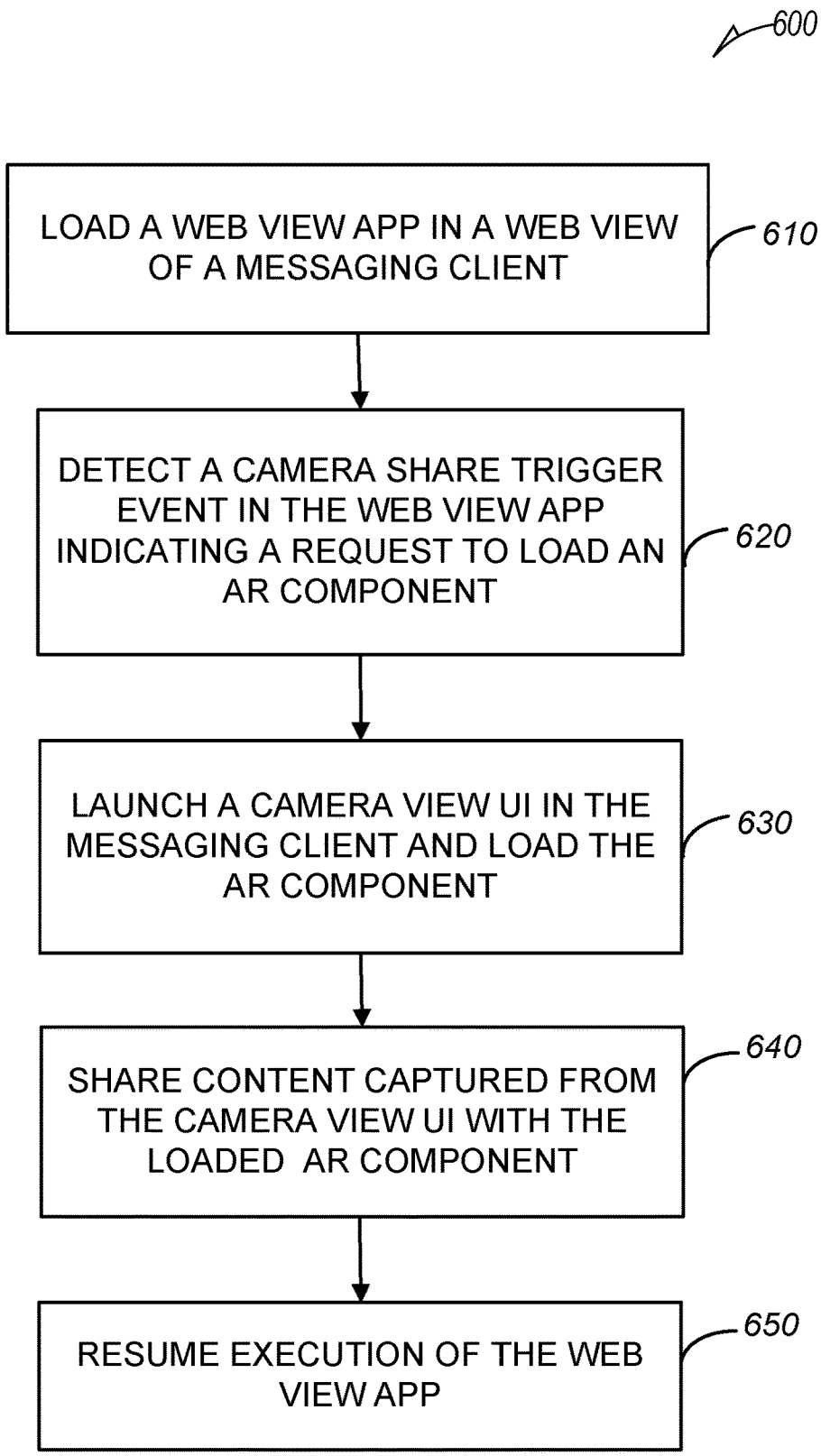
FIG. 6 is a flowchart of a method for providing integration of web view applications with augmented reality components, in accordance with some examples.

FIG. 6 is a flowchart of a method 600 for providing integration of web view applications with augmented reality components, in accordance with some examples, directly from a third-party resource. Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems.

In various examples, some or all processing logic resides at the messaging system 100 that embodies a number of subsystems, which may be supported on the client-side by the messaging client 104, and on the sever-side by the application servers 114. The method 600 commences at operation 610, a web view application is loaded in the messaging client executing at a sender computing device. The web view application includes the SDK configured to facilitate access to an AR component directly from the web application. The web view may include a user selectable element actionable to request that the AR component is loaded in the camera view UI of the messaging client. For the purposes of this disclosure, an event associated with activation of the user selectable element actionable to request that the AR component is loaded in the camera view UI is referred to as a camera share trigger event. At operation 620, the SDK included in the web view application detects a camera share trigger event and communicates the request to the bridge method included in the web view interface component responsible for launching and hosting a web view in the messaging client. The web view interface component communicates the request to the validation service residing at the backend of the messaging client for validation of the identification of the AR component included in the request. If validation is successful the web view interface converts the identification of the AR component into an identifier internal to the messaging system, if necessary, unlocks the AR component to make the AR component available for loading in the camera view UI, and loads the AR component in the camera view UI at operation 630. As explained above, a user can capture the output of the digital image sensor modified by the AR component and activate a share flow from camera view UI, which may result in communication of the captured content from the messaging client executing at the sender computing device to the messaging client executing at another computing device or in posting the captured content to be available for viewing to at least a subset of users of the messaging system. At operation 640, the captured content is shared and, at operation 650, the web view interface dismisses the camera view UI after at the end of share flow and resumes execution of the web view application at the point at which the web view AR system was engaged from the web application.

Figure 7:
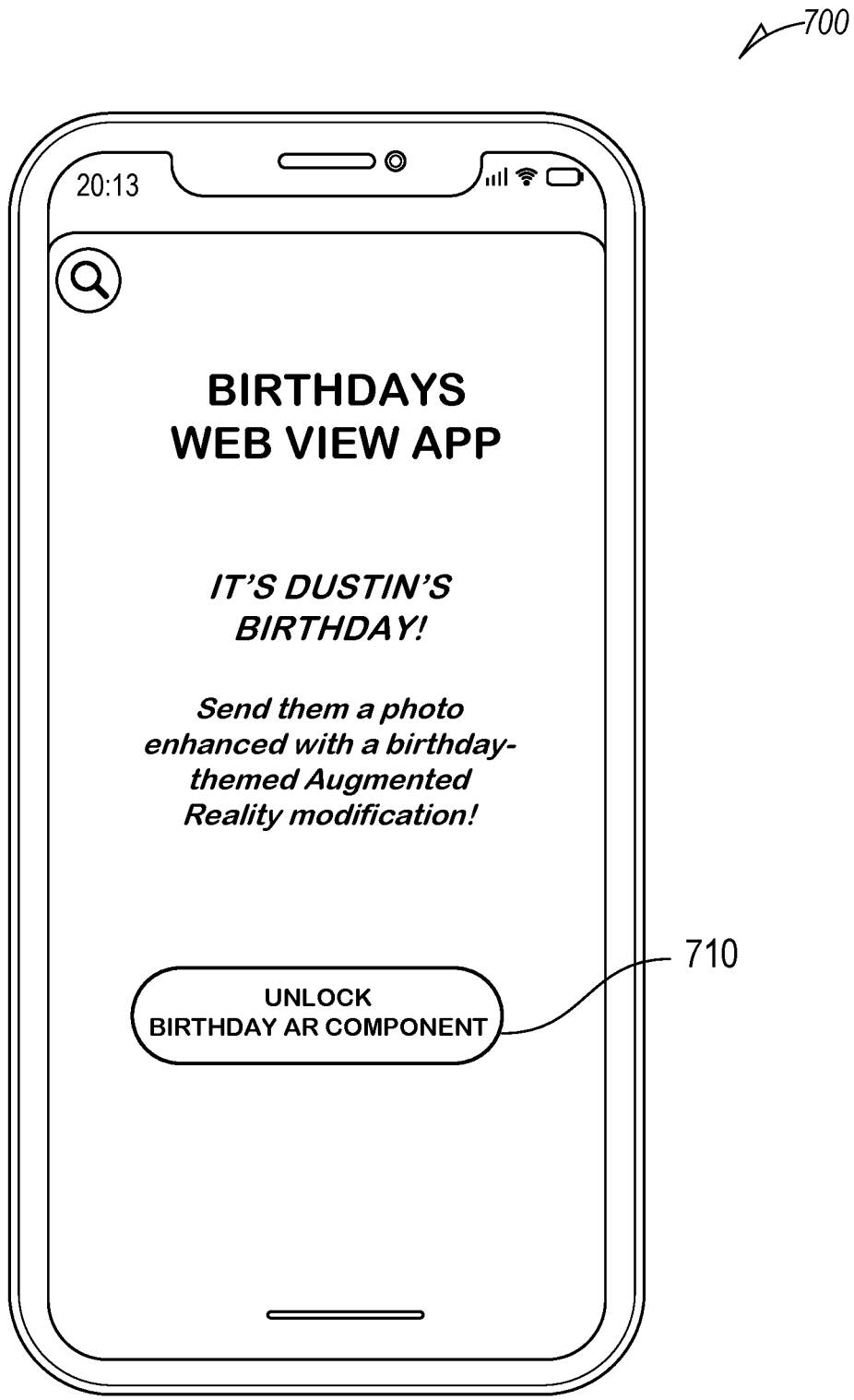
FIG. 7 is a diagrammatic representation of a web view application screen, in accordance with some examples.

FIG. 7 is a diagrammatic representation of a web view application screen 700, in accordance with some examples. The web view application screen 700 represents a web view application configured to permit a user to wish happy birthday to another user by sending them an image enhanced by an AR component that adds a party to a person's head in the image and a birthday wish text. The AR component that adds a party to a person's head in the image and a birthday wish text can be activated by engaging a user selectable element 710.

Figure 8:
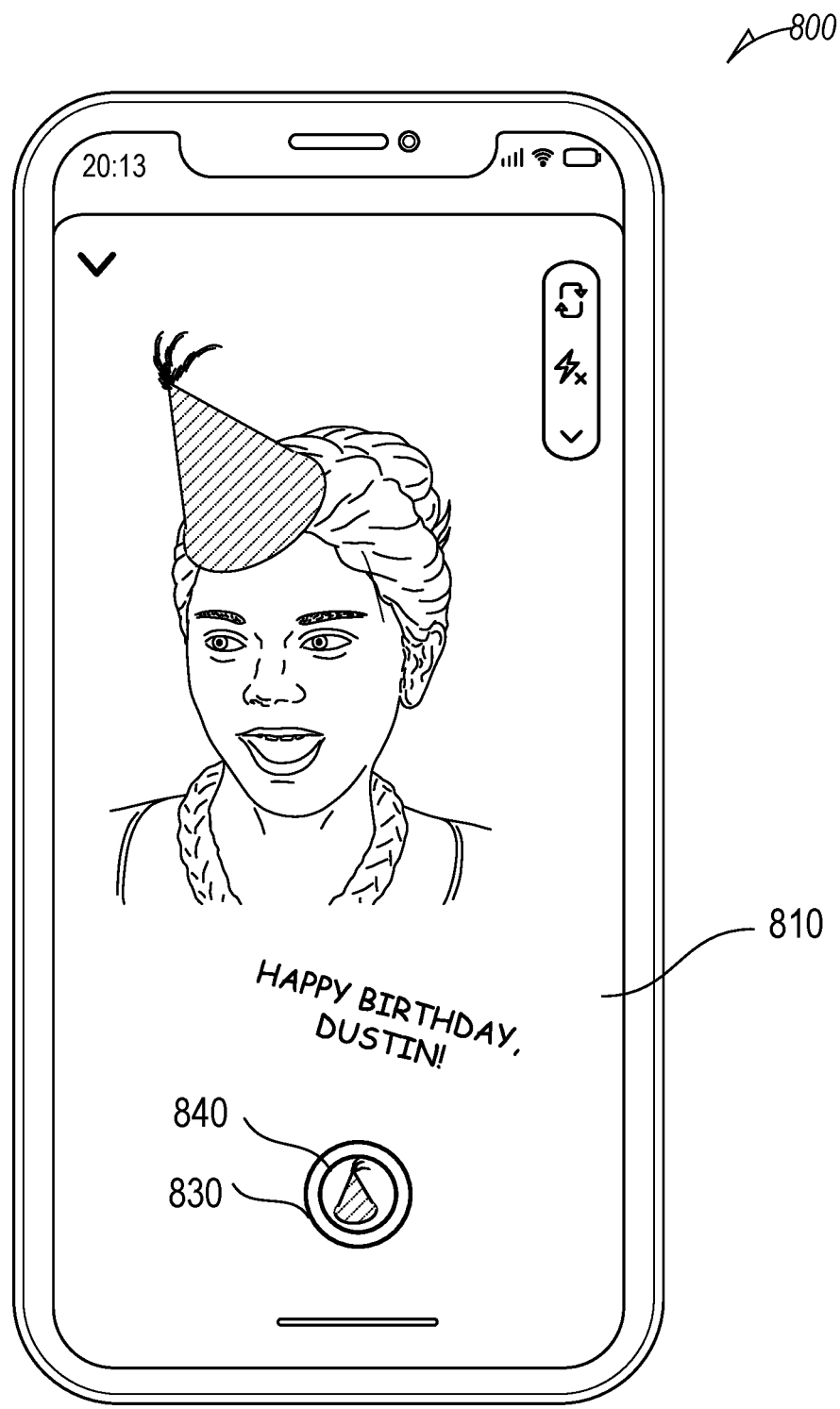
FIG. 8 is a diagrammatic representation of a camera view UI with an AR component loaded, in accordance with some examples.

FIG. 8 is a diagrammatic representation of a camera view UI 800 with an AR component loaded, in accordance with some examples. Shown in FIG. 8 is a user selectable element 830, referred to as a shutter user selectable element, actionable to capture an image by the camera or to start and stop video recording. The graphics 840 depicts a party hat, which indicates that the associated AR component is loaded in the camera view UI 800. The modification provided by the AR component results in adding a party hat to the image of a user's head in area 810, and the caption "HAPPY BIRTHDAY, DUSTIN!" The AR component in this example is configured to accept a launch attribute from the web view application. The launch attribute is the name of the user who is the intended recipient of the birthday wish, "Dustin" in this case.

Figure 9:
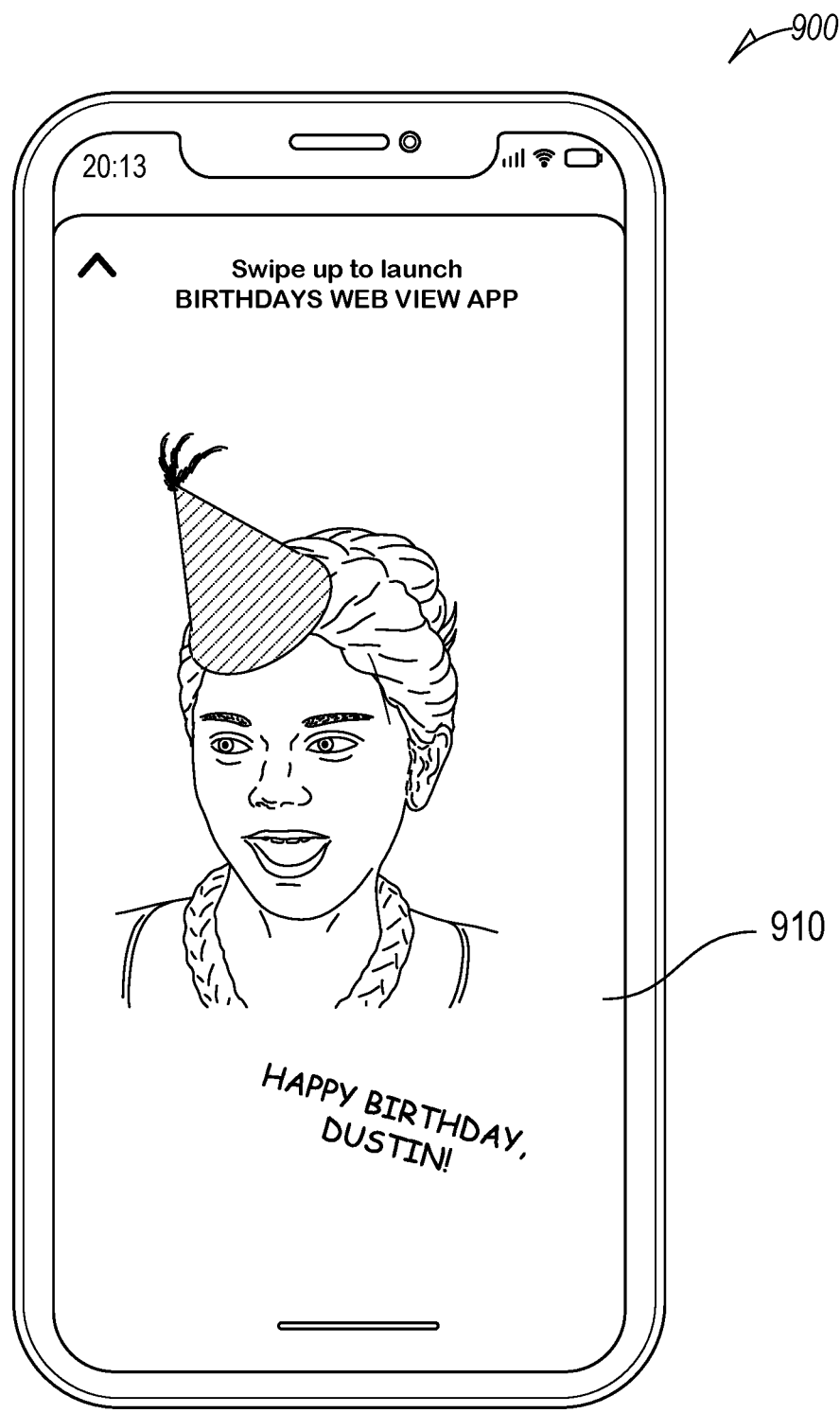
FIG. 9 is a diagrammatic representation of a recipient view of content captured using an AR component loaded directly from a web view application, in accordance with some examples.

FIG. 9 is a diagrammatic representation of a recipient view 900 of content captured using an AR component loaded directly from a web view application, in accordance with some examples. The recipient view 900 includes, in area 910, the image of a user wearing a party hat and the caption "HAPPY BIRTHDAY DUSTIN!" The recipient view 900 is configured to permit the viewer to launch the web view application at their computing device in response to a predetermined action, such as swiping up.

Machine Architecture

Figure 10:
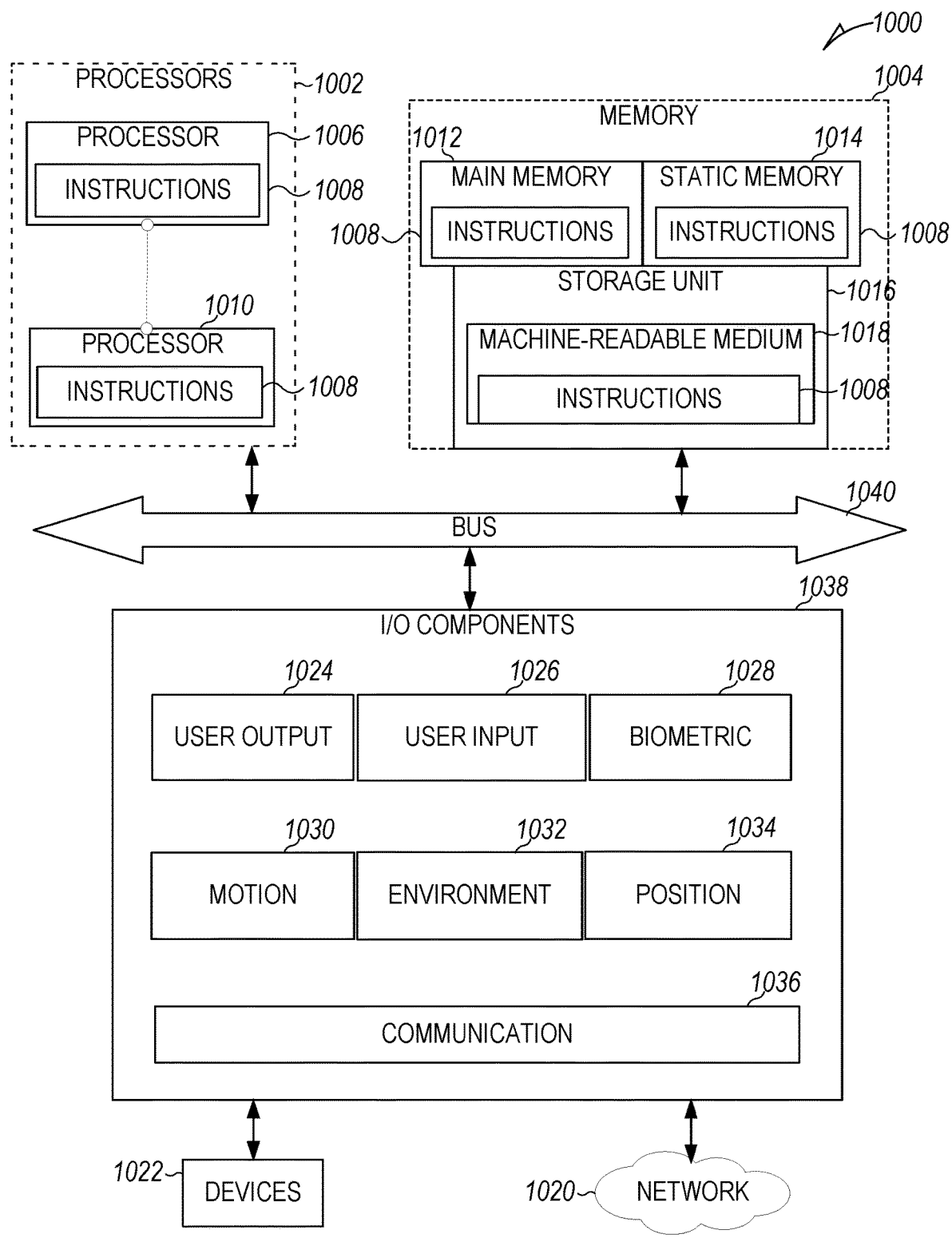
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an application, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output I/O components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1040. The main memory 1012, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front facing cameras on a front surface of the client device 102 and rear cameras on a rear surface of the client device 102. The front facing cameras may, for example, be used to capture still images and video of a user of the client device 102 (e.g., "selfies"), which may then be augmented with augmentation data (e.g., filters) described above. In the examples where the front facing camera is used with a viewfinder ring flash described herein, the user has the ability to use augmented reality face filters in low light conditions, even in complete darkness, as the viewfinder ring flash illuminates the user's face without obscuring the output of the digital image sensor. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface Component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF410, Ultra Code, UCC RSS-2D bar code, and other optical codes), or acoustic detection components (e.g., microphones to identify tagged audio signals). In addition, a variety of information may be derived via the communication components 1036, such as location via. Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
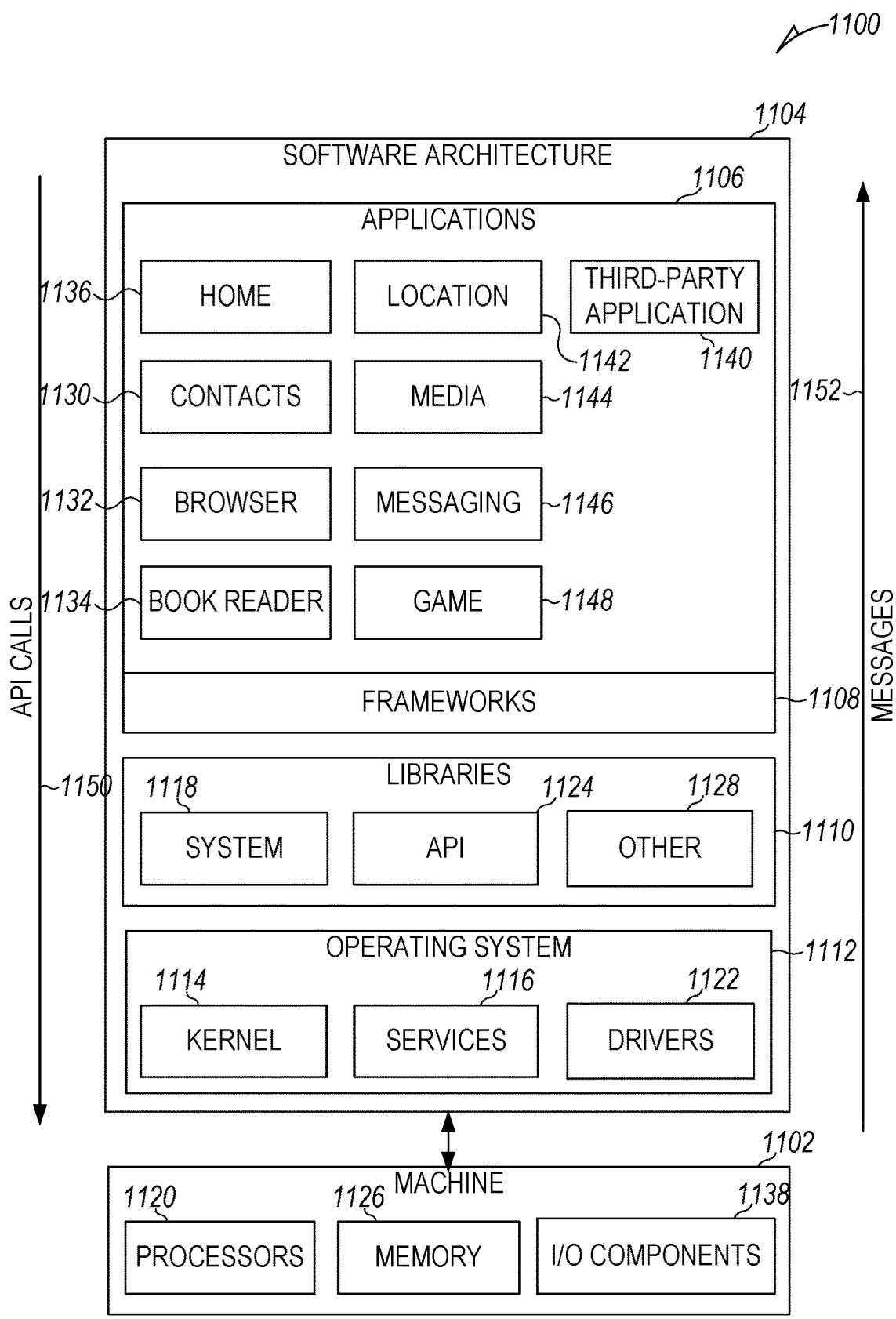
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by, software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    loading a web view application in a web view provided by an embedded web browser of a messaging client executing at a sender computing device, the web view including a user selectable element;
    detecting a camera share trigger event in the web view application in response to activation of the user selectable element, the camera share trigger event indicating a request to load an augmented reality (AR) component configured to apply a modification to a media content item; and
    in response to the camera share trigger event, loading the AR component in a camera view user interface (UI) of the messaging client, the camera view UI including an output of a digital image sensor of a camera and a shutter user selectable element actionable to capture the output of the digital image sensor of the camera, the loading of the AR component in the camera view UI comprising applying the modification to the output of the digital image sensor.

2. The method of claim 1, further comprising:
    capturing the output of the digital image sensor of the camera as augmented by the modification to create captured content; and
    in response to detecting a request at the messaging client to share the captured content:
        generating shared content by including, with the captured content, a web view application launch component configured to launch the web view application; and
        communicating the shared content to a recipient computing device.

3. The method of claim 2, further comprising:
    in response to the communicating of the shared content to the recipient computing device, loading the web view application in a recipient messaging client executing at the recipient computing device.

4. The method of claim 2, further comprising:
    in a recipient messaging client executing at the recipient computing device:
    rendering the shared content on a display device;
    detecting a user-initiated action with respect to the shared content; and
    in response to the user-initiated action, loading the web view application in the web view provided by the embedded web browser of the recipient messaging client executing at the recipient computing device.

5. The method of claim 4, wherein the user-initiated action is a swipe gesture.

6. The method of claim 1, further comprising:
    at the messaging client executing at the sender computing device, decrypting a payload of a deep link included in the web view application to obtain an AR component identifier; and
    providing the AR component identifier to a validation service executing at a backend, wherein the loading of the AR component in the camera view UI is in response to successful validation of the AR component identifier.

7. The method of claim 1, wherein the AR component is configured to apply the modification according to values of one or more attributes, wherein the values are obtained from the web view application.

8. The method of claim 1, wherein the AR component is the only AR component in the camera view user interface.

9. The method of claim 1, wherein the modification comprises adding animation to the media content item.

10. The method of claim 1, wherein the web view application is provided by a distinct entity from the messaging client.

11. A system comprising:
    one or more processors; and
    a non-transitory computer readable storage medium comprising instructions that when executed by the one or processors cause the one or more processors to perform operations comprising:
        loading a web view application in a web view provided by an embedded web browser of a messaging client executing at a sender computing device, the web view including a user selectable element;
        detecting a camera share trigger event in the web view application in response to activation of the user selectable element, the camera share trigger event indicating a request to load an augmented reality (AR) component configured to apply a modification to a media content item; and
        in response to the camera share trigger event, loading the AR component in a camera view user interface (UI) of the messaging client, the camera view UI including an output of a digital image sensor of a camera and a shutter user selectable element actionable to capture the output of the digital image sensor of the camera, the loading of the AR component in the camera view UI comprising applying the modification to the output of the digital image sensor.

12. The system of claim 11, wherein the operations caused by instructions executed by the one or more processors further include:
capturing the output of the digital image sensor of the camera as augmented by the modification to create captured content; and
in response to detecting a request at the messaging client to share the captured content:
generating shared content by including, with the captured content, a web view application launch component configured to launch the web view application; and
communicating the shared content to a recipient computing device.

13. The system of claim 12, wherein the operations caused by instructions executed by the one or more processors further include:
in response to the communicating of the shared content to the recipient computing device, loading the web view application in a recipient messaging client executing at the recipient computing device.

14. The system of claim 12, wherein the operations caused by the instructions executed by the one or more processors further include:
in a recipient messaging client executing at the recipient computing device:
rendering the shared content on a display device;
detecting a user-initiated action with respect to the shared content; and
in response to the user-initiated action, loading the web view application in the web view provided by the embedded web browser of the recipient messaging client executing at the recipient computing device.

15. The system of claim 14, wherein the user-initiated action is a swipe gesture.

16. The system of claim 11, wherein the operations caused by the instructions executed by the one or more processors further include:
at the messaging client executing at the sender computing device, decrypting a payload of a deep link included in the web view application to obtain an AR component identifier; and
providing the AR component identifier to a validation service executing at a backend, wherein the loading of the AR component in the camera view UI is in response to successful validation of the AR component identifier.

17. The system of claim 11, wherein the AR component is configured to apply the modification according to values of one or more attributes, wherein the values are obtained from the web view application.

18. The system of claim 11, wherein the AR component is the only AR component in the camera view user interface.

19. The system of claim 11, wherein the modification comprises adding animation to the media content item.

20. A machine-readable non-transitory storage medium having instruction data executable by a machine to cause the machine to perform operations comprising:
in a messaging system for exchanging data over a network,
loading a web view application in a web view provided by an embedded web browser of a messaging client executing at a sender computing device, the web view including a user selectable element;
detecting a camera share trigger event in the web view application in response to activation of the user selectable element, the camera share trigger event indicating a request to load an augmented reality (AR) component configured to apply a modification to a media content item; and
in response to the camera share trigger event, loading the AR component in a camera view user interface (UI) of the messaging client, the camera view UI including an output of a digital image sensor of a camera and a shutter user selectable element actionable to capture the output of the digital image sensor of the camera, the loading of the AR component in the camera view UI comprising applying the modification to the output of the digital image sensor.

* * * * *